INVENTOR:
MOYE WICKS, III
BY: *Thomas A. Lampe*
HIS ATTORNEY

United States Patent Office 3,548,637
Patented Dec. 22, 1970

3,548,637
VELOCITY PROFILE SENSOR SYSTEM FOR CONTROL OF A SLURRY PIPELINE
Moye Wicks III, Houston, Tex., assignor to Shell Oil Company, New York, N.Y., a corporation of Delaware
Filed Apr. 11, 1969, Ser. No. 815,364
Int. Cl. G01n *11/00;* G01p *5/12*
U.S. Cl. 73—53                                              5 Claims

ABSTRACT OF THE DISCLOSURE

Apparatus and method of detecting the heterogeneous flow of a slurry so that corrective action may be taken by flowing the slurry through a pipeline so that the slurry continuously substantially occupies a preselected portion of the throughbore defined by the pipeline and selecting at least two locations within the pipeline throughbore portion with a first location being selected near the top of the pipeline and a second location being selected near the bottom of the pipeline. The slurry flow velocity at the first location is detected while the slurry flow velocity is substantially simultaneously detected at the second location. Finally, the detected slurry flow velocities at the two locations are compared to determine the heterogeneity of the slurry.

---

The present invention relates to pipeline transport operations; and, more particularly, to a method and apparatus for detecting the existence of heterogeneity in a slurry so that appropriate corrective action may be taken to prevent a plug or other instability from forming.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

During slurry transport operations the most important characteristic of a slurry pipeline's performance is its ability to carry the slurry at a steady rate with the slurry remaining in a stable condition. In the event a plug or other instability forms in the slurry, flow rate may substantially diminish or the flow may terminate altogether, possibly necessitating costly repairs and other maintenance activities in order to resume flow at the desired rate. Measurements of flow rate and pressure drop in the line may be made to determine a pipeline's performance; however, such measurements furnish only indirect indications of slurry instability. Accordingly, a time lag may result between formation of unstable condition and the first warning to take corrective action. Such delay may prove costly.

SUMMARY OF THE INVENTION

It is therefore a primary object of the present invention to provide a system which detects the existence of heterogeneity in a slurry by direct measurement so that corrective action may be taken promptly before an excessively unstable condition has an opportunity to develop.

This and other objects have been attained in the present invention by providing a system whereby heterogeneity in a slurry flowing through a pipeline may be directly detected so that appropriate corrective action may be promptly commenced. Such heterogeneity is detected by inserting a plurality of flow velocity detection devices such as thermistors in the pipeline with at least two such devices positioned substantially along a pipe cross section with one of the devices sensing fluid flow velocity near the top of the pipe and the other of the devices sensing fluid flow velocity near the bottom of the pipe. By comparing the indications of flow velocity at the top and bottom of the pipe, the existence of heterogeneity in the slurry may readily be determined.

DESCRIPTION OF THE DRAWING

The objects of this invention will be understood from the following description, taken with reference to the drawing, wherein:

Referring now to FIG. 1, a section of pipeline 11 is illustrated in which it will be assumed that slurry is flowing in the direction of the arrow. When the slurry material is in the state of near-homogeneous flow shown in FIG. 1, the solids concentration within the slurry and the slurry velocity will be relatively uniform over the flow area. In FIG. 1, for example, the concentration profile typically found during a condition of homogeneous flow is indicated by means of reference numeral 12, while a corresponding velocity profile is indicated by means of reference numeral 13.

Figure 2:
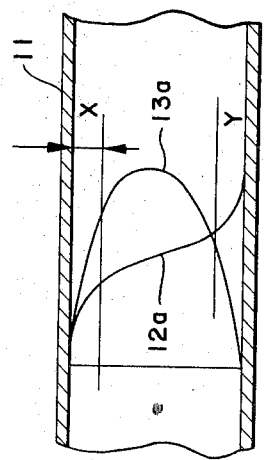
FIG. 2 is a view similar to that shown in FIG. 1, but illustrating a heterogeneous flow condition.

Below a certain critical velocity, however, which depends on the solid and liquid characteristics of the slurry as well as the size of the pipeline, both concentration and velocity vary significantly from their normal homogeneous flow state. During such a heterogeneous flow condition a danger of plug formation exists since the slurry solid phase material tends to settle out in the pipeline as flow velocity diminishes. A typical heterogeneous flow condition is illustrated in FIG. 2 with the concentration profile found in such condition indicated by means of reference numeral 12a and the corresponding velocity profile indicated by means of reference numeral 13a.

Figure 3:
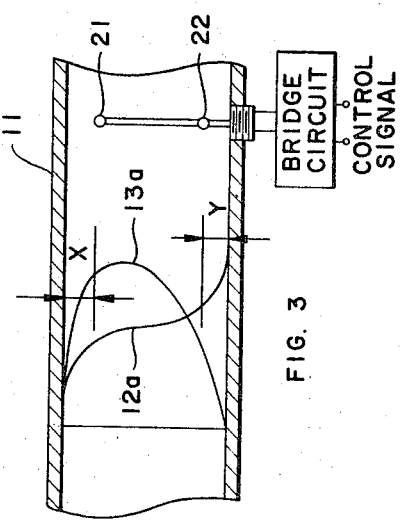
FIG. 3 is a schematic cross-sectional view in longitudinal projection illustrating a section of slurry pipeline having flow detection devices in operative association therewith in accordance with the teachings of the present invention.

Utilizing the principles of the present invention, heterogeneity may be detected by direct measurement, thus permitting the prompt taking of corrective action. This is accomplished by inserting flow velocity detecting devices at strategic locations within the pipeline. In FIG. 3, flow velocity detecting devices in the form of thermistors 21 and 22 are shown as being positioned within slurry pipeline 11. Thermistor 21 is located a distance X from the top of the pipeline, while thermistor 22 is located a distance Y from the bottom of the pipeline. For example, X and Y may be selected both equal to ⅛ of a pipe diameter. The thermistors are positioned substantially in line along a cross section taken through the pipeline as shown.

Figure 4:
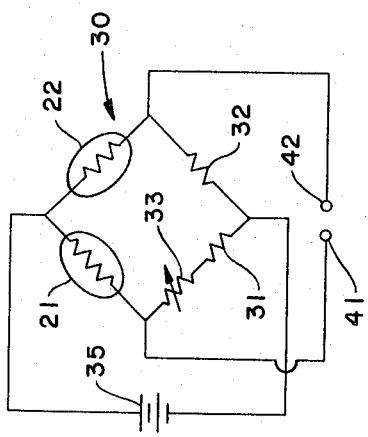
FIG. 4 is a detail schematic view illustrating electrical bridge circuitry utilized in carrying out the teachings of the present invention.
Figure 1:
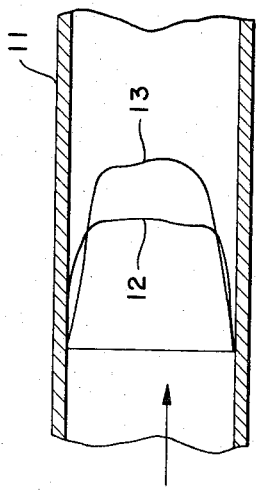
FIG. 1 is a schematic cross-sectional view taken on longitudinal projection of a section of slurry pipe and illustrating typical slurry concentration and velocity profiles found during substantially homogeneous flow conditions.

Thermistors 21 and 22 comprise a portion of a conventional bridge circuit of the type shown in FIG. 4. As may be seen with reference to this latter figure, the thermistors are disposed in adjacent branches of the bridge circuit 30. Resistors 31 and 32 and variable resistor 33 are disposed in the remaining branches of the bridge circuit as illustrated. Bridge 30 is operatively associated with a suitable electrical supply source 35 in a conventional manner. It will be readily understood that when the velocities detected by thermistors 21 and 22 are substantially the same, the bridge output will be zero, provided that the response of the thermistors is substantially the same, i.e., they are sufficiently alike in size, etc., so that the same velocity causes essentially the same voltage imbalance across each one. When this situation exists a homogeneous flow condition is present along the selected cross-section of slurry pipeline. When, however, a heterogeneous flow condition exists, the velocities detected by thermistors 21 and 22 will differ and an electrical imbalance will exist across bridge output terminals 41 and 42. Such electrical imbalance may be effective to actuate a signal whereby suitable corrective steps may be manually carried out; alternatively, the bridge output terminals may be directly operatively associated with a suitable automatic apparatus which is effective to carry out corrective measures immediately upon detection of a flow velocity imbalance of a preselected magnitude.

Figure 5:
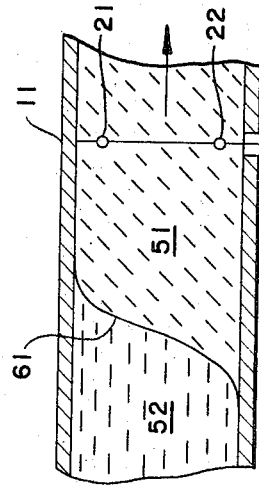
FIG. 5 is a cross-sectional schematic view of a section of slurry pipeline illustrating how the principles of the present invention may be applied to alternative flow conditions.

The output from the bridge can, moreover, be used to indicate the presence of a batch of slurry or other material whose properties vary over the pipe cross-section. Such might be the case, for example, when a batching liquid is pumped through a pipeline behind a slurry. This situation is illustrated in FIG. 5, wherein pipeline 11 is shown being utilized to transport, in the direction of the arrow, a slurry 51 followed by a liquid 52. The slurry and liquid may fomr an interface 61, the existence of which will be detected by the thermistors 21 and 22. Thermistor 21 will obviously sense the presence of liquid 52 before thermistor 22. When this mode of operation is employed, it is necessary to disarm the control function which would otherwise sense that the pipeline was in a severe state of heterogeneity. The signal's polarity would be reversed if the slurry were displacing liquid ahead of it.

I claim as my invention:

1. Apparatus for transporting a slurry and for detecting the existence of heterogeneity in said slurry so that corrective action may be taken to reduce said heterogeneity, said apparatus comprising:
    a pipeline defining a throughbore in which said slurry is transported; and
    slurry flow velocity detecting means disposed in operative association with said pipeline, said velocity detecting means comprising at least two thermistor means positioned substantially in line across a cross-section of said pipeline, one of said thermistor means being located a predetermined distance from the top of the pipeline and the other of said thermistor means being located a like distance from the bottom of said pipeline, said thermistor means being adapted to detect any velocity flow inbalance between said locations, said inbalance being indicative of a heterogeneous flow condition.

2. The apparatus according to claim 1 wherein said thermistor means are disposed in adjacent branches of a bridge circuit, said bridge circuit being operatively associated with an electrical supply source and effective to produce an electrical imbalance across the output terminals thereof upon detection of a heterogeneous flow condition by said thermistor means.

3. A method of detecting heterogeneous flow of a slurry so that corrective action may be taken, said method comprising the steps of:
    flowing said slurry through a pipeline so that the slurry continuously substantially occupies a preselected portion of the throughbore defined by said pipeline;
    selecting at least two locations within said pipeline throughbore portion with a first location being selected near the top of the pipeline and a second location being selected near the bottom of the pipeline;
    detecting the slurry flow velocity at said first location;
    substantially simultaneously detecting the slurry flow velocity at said second location; and
    comparing the detected slurry flow velocities to thereby determine the heterogeneity of said slurry.

4. The method according to claim 3 the step of selecting at least two locations includes the steps of selecting said first location a predetermined distance below said pipeline top and said selecting second location above said pipeline bottom the same predetermined distance.

5. The method according to claim 4 wherein the steps of selecting said predetermined distance includes the step of selecting a predetermined distance substantially equal to one-eighth of the pipeline diameter.

References Cited

UNITED STATES PATENTS

| | | | |
|---|---|---|---|
| 2,780,094 | 2/1957 | Fink | 73—53 |
| 2,828,479 | 3/1958 | Jackson | 73—53UX |
| 3,030,806 | 4/1962 | Davis | 73—204 |
| 3,085,431 | 4/1963 | Yerman et al. | 73—204 |
| 3,464,269 | 9/1969 | Froger | 73—204 |

FOREIGN PATENTS

| | | | |
|---|---|---|---|
| 1,035,368 | 7/1966 | Great Britain | 73—204 |
| 6,704,596 | 10/1968 | Netherlands | 73—61 |

LOUIS R. PRINCE, Primary Examiner

J. W. ROSKOS, Assistant Examiner

U.S. Cl. X.R.

73—204